United States Patent
Ansari et al.

(10) Patent No.: US 10,736,053 B2
(45) Date of Patent: Aug. 4, 2020

(54) TECHNIQUE FOR DATA TRANSMISSION IN A RADIO ACCESS NETWORK

(71) Applicant: Telefonaktiebolaget LM Ericsson (publ), Stockholm (SE)

(72) Inventors: Junaid Ansari, Fürth (DE); Gen Li, Beijing (CN); Eliane Semaan, Sundbyberg (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 0 days.

(21) Appl. No.: 16/321,895

(22) PCT Filed: Aug. 10, 2016

(86) PCT No.: PCT/CN2016/094400
§ 371 (c)(1),
(2) Date: Jan. 30, 2019

(87) PCT Pub. No.: WO2018/027677
PCT Pub. Date: Feb. 15, 2018

(65) Prior Publication Data
US 2019/0166563 A1 May 30, 2019

(51) Int. Cl.
*H04W 52/26* (2009.01)
*H04W 52/42* (2009.01)
*H04B 17/10* (2015.01)
*H04B 7/06* (2006.01)
*H04B 7/0408* (2017.01)
*H04W 16/14* (2009.01)
(Continued)

(52) U.S. Cl.
CPC ........ *H04W 52/265* (2013.01); *H04B 7/0408* (2013.01); *H04B 7/0617* (2013.01); *H04B 17/102* (2015.01); *H04W 16/14* (2013.01); *H04W 28/0268* (2013.01); *H04W 52/42* (2013.01); *H04L 1/0003* (2013.01)

(58) Field of Classification Search
CPC ............... H04W 52/265; H04W 16/14; H04W 28/0268; H04W 52/42; H04B 7/0617; H04B 17/102; H04B 7/0408; H04L 1/0003
See application file for complete search history.

(56) References Cited

U.S. PATENT DOCUMENTS 8,300,716 B1 10/2012 Lee et al.
8,630,596 B2 1/2014 Harel et al.
(Continued)

FOREIGN PATENT DOCUMENTS

CN 104734766 A 6/2015
WO 2008021182 A2 2/2008

OTHER PUBLICATIONS

Extended European Search Report for European Patent Application No. 16912132.4 dated Mar. 9, 2020, 7 pages.

*Primary Examiner* — Dong-Chang Shiue
(74) *Attorney, Agent, or Firm* — Sage Patent Group

(57) ABSTRACT

A technique for transmitting data in a radio access network is described. As to a method aspect of the technique, the Quality of Service (QoS) requirements for the data to be transmitted are determined. The data is transmitted using an antenna array for beamforming. Both the beamforming and a transmit power (404) of the data transmission are controlled according to the QoS requirements and within an upper limit (406) for a radiant intensity (302) of the data transmission.

26 Claims, 7 Drawing Sheets

(51) Int. Cl.
*H04W 28/02* (2009.01)
*H04L 1/00* (2006.01)

(56) References Cited

U.S. PATENT DOCUMENTS

| | | |
|---|---|---|
| 9,306,640 B2 | 4/2016 | Jia et al. |
| 2005/0272472 A1* | 12/2005 | Goldberg .............. H04W 16/28 |
| | | 455/562.1 |
| 2013/0237272 A1 | 9/2013 | Prasad |
| 2013/0244716 A1* | 9/2013 | Lee ....................... H04W 52/42 |
| | | 455/522 |
| 2013/0271322 A1* | 10/2013 | Harel ................... H04B 7/0404 |
| | | 342/368 |
| 2014/0071838 A1* | 3/2014 | Jia ........................... H04B 7/04 |
| | | 370/252 |
| 2015/0282001 A1 | 10/2015 | Kwak et al. |
| 2016/0353424 A1* | 12/2016 | Stirling-Gallacher ....................... H04B 7/0626 |
| 2018/0317246 A1* | 11/2018 | Mukherjee ........ H04W 74/0816 |
| 2019/0075526 A1* | 3/2019 | Nagaraj .............. H04W 52/242 |

\* cited by examiner

TECHNIQUE FOR DATA TRANSMISSION IN A RADIO ACCESS NETWORK

TECHNICAL FIELD

The present disclosure generally relates to a technique for transmitting data in a radio access network. More specifically, and without limitation, a method and a device are provided for determining beamwidth, transmit power and modulation-and-coding scheme for transmitting data in a radio access network.

BACKGROUND

The continuous evolution of wireless communication leads to networks that cover many different use cases in many different frequency spectra. With a wide array of applications, the targets for reliability and throughput to be fulfilled by the network vary drastically. Moreover, regulatory constraints on the wireless communication, radio frequency planning for the network and the capabilities of devices participating in the network demand appropriate selection and adaptation of the transmission parameters as well as optimization of the modulation-and-coding scheme. In particular, the transmit power control, the adaptive antenna beamforming and the selection of the modulation-and-coding scheme are highly important in order to achieve the target throughput and reliability.

Evolving cellular wireless networks (e.g., fifth generation or 5G networks) overcome the limitations of existing cellular networks by allowing for higher data rates, less latency, less energy consumption and to satisfy the ever-increasing traffic demand. For this purpose, additional spectrum beyond what was previously allocated to existing standards and, in some use cases, denser deployments are applied. The use of higher frequency bands (e.g., including licensed, unlicensed and licensed-shared spectrum) overcomes the scarcity of spectrum resources by enabling wider frequency bandwidths and allows more advanced antenna arrays for massive beamforming. A massive growth in the number of connected devices as well as an increasingly wide range of applications enables a well-functioning networked society, in which information can be accessed and data shared anywhere and anytime, by anyone and anything.

In addition, the evolution of existing technologies (e.g., Wi-Fi or any technology based on IEEE 802.11, as well as the fourth generation, or 4G, cellular wireless networks such as 3GPP Long Term Evolution or LTE) is challenged by the same demands. Multi-antenna technologies have a key role in the design of modern Radio Access Technologies (RATs) due to their well-recognized benefits, e.g. according to IEEE 802.11ac and IEEE 802.11ax. Specifically, they enable array gain, spatial multiplexing and spatial diversity, which lead to improved coverage, capacity, and robustness. The multi-antenna features have significantly contributed to the success of LTE and continue driving its evolution.

Multi-antenna technologies are particularly relevant in high-frequency bands as a counter measure to propagation loss increasing with frequency, e.g., atmospheric attenuation, rain fading, foliage attenuation, reduced penetration of walls, diffraction loss (or fast fading) and obstruction loss (or slow fading). While some of the loss aspects are minor problems for lower frequency bands, their impact becomes severe in centimeter and millimeter wave ranges. For example, the communication range limited by path-loss advantageously reduces the frequency reuse distance. Thus, denser deployment, larger bandwidth and smaller beamwidth (e.g., higher antenna gain) can partially compensate, or even overcompensate, the disadvantage of higher path-loss.

Existing wide area networks primarily use licensed spectrum. The license costs are significant but permit high transmit power, accurate cell planning and full frequency reuse without the need to apply access schemes, such as Listen-Before-Talk (LBT) and/or restricted radio duty cycles, in the licensed spectrum. This ensures good coverage even in areas of sparse deployments. The exclusive use of the spectrum minimizes the risk of delay spikes and maximizes the capacity.

On the other hand, Wi-Fi, LTE License-Assisted Access (LAA), LTE in unlicensed spectrum (LTE-U), MulteFire and other emerging technologies, use unlicensed spectrum. Such technologies permit use cases (e.g., corporate networks, in-house network or inter-vehicle communication) for which licensed spectrum is not applicable or not available, given that any transmitting device ensures fair access to the spectrum, e.g., by means of a coexistence mechanism such as LBT. Energy detection just before a planned transmission burst may reveal that the spectrum is already used by another device. A back-off scheme keeps access delay short while making the spectrum sharing fair. LBT schemes are efficient if occupancy of radio resources is low (e.g., at relatively low transmit power levels and/or a few number of contending stations within range of communication). Correspondingly, for a transmitter in unlicensed spectrum, the maximum allowed transmit power and the power spectrum density is subject to regulatory restrictions. The main purpose for having such restrictions is to establish fair coexistence among the different technologies that are operating in these bands. These restrictions are specific for region and frequency band. Thus, the restrictions highly depend on the specific band allocated to the various applications.

Hence, these factors and restrictions pose several design challenges on evolving RATs but also provide opportunities for further use cases.

SUMMARY

Accordingly, there is a need for a data transmission technique that allows harnessing the benefits of certain radio spectra while observing restrictions associated therewith.

As to one aspect, a method of transmitting data in a radio access network (RAN) is provided. The method comprises or triggers a step of determining Quality of Service (QoS) requirements for the data to be transmitted; and a step of transmitting the data using an antenna array for beamforming, wherein both the beamforming and a transmit power of the data transmission are controlled according to the QoS requirements and within an upper limit for a radiant intensity of the data transmission.

Herein, the data transmission "in a RAN" may be performed by any or each participant of the RAN, e.g., a first station configured to provide radio access in the RAN (e.g., a base station) and/or a second station configured to access the RAN (e.g., a wireless device). The method may be applicable for both base station and wireless device, or any two communicating devices, e.g., at least one of which may provide reference signal information for setting transmission parameters.

As to another aspect, a computer program product is provided. The computer program product comprises program code portions for performing any one of the steps of the method aspects disclosed herein when the computer program product is executed by one or more computing devices. The computer program product may be stored on a computer-readable recording medium. The computer program product may also be provided for download via a data network, e.g., the RAN and/or the Internet. Alternatively or in addition, the method may be encoded in a field-programmable gate array (FPGA) and/or an application-specific integrated circuit (ASIC), or the functionality may be provided for download by means of a hardware description language.

As to a further aspect, a device for transmitting data in a RAN is provided. The device comprises a determining unit adapted to determine QoS requirements for the data to be transmitted; and a transmitting unit adapted to transmit the data using an antenna array for beamforming, wherein both the beamforming and a transmit power of the data transmission are controlled according to the QoS requirements and within an upper limit for a radiant intensity of the data transmission.

As to a still further aspect, a device for transmitting data in a RAN is provided. The device comprises a processor and a memory, said memory containing instructions executable by said processor whereby the device is operative to determine QoS requirements for the data to be transmitted; and to transmit the data using an antenna array for beamforming, wherein both the beamforming and a transmit power of the data transmission are controlled according to the QoS requirements and within an upper limit for a radiant intensity of the data transmission.

As to a still further aspect, a station of a RAN is provided. The station comprises a QoS module for determining a QoS requirement for data to be transmitted; and a transmission module for transmitting the data using an antenna array for beamforming, wherein both the beamforming and a transmit power of the data transmission are controlled according to the QoS requirements and within an upper limit for a radiant intensity of the data transmission.

As to a further aspect, a RAN is provided. The RAN comprises at least one device and/or at least one station according to any one of above aspects.

Any one of the devices, the station and the RAN may further include any feature disclosed in the context of the method aspect. Particularly, any one of the units or modules, or a dedicated unit or module, may be adapted to perform one or more of the steps of the method aspect. Each of the devices may include, or may be implemented by, one or more stations of the RAN.

Advantageous embodiments are specified by the depending claims.

BRIEF DESCRIPTION OF THE DRAWINGS

Further details of embodiments of the technique are described with reference to the enclosed drawings, wherein.

DETAILED DESCRIPTION

In the following description, for purposes of explanation and not limitation, specific details are set forth, such as a specific network environment, in order to provide a thorough understanding of the technique disclosed herein. It will be apparent to one skilled in the art that the technique may be practiced in other embodiments that depart from these specific details. Moreover, while the following embodiments are primarily described for an implementation of a fifth generation (5G) network, it is readily apparent that the technique described herein may also be implemented in any other radio access network (RAN), including a 3GPP Long Term Evolution (LTE) RAN, LTE in unlicensed spectrum (LTE-U), an LTE License-Assisted Access (LTE LAA) network, a MulteFire RAN according to the MulteFire Alliance, a Wireless Local Area Network (WLAN or Wi-Fi) according to the standard family IEEE 802.11, a ZigBee network based on the standard specification IEEE 802.15.4, a Z-Wave network according to the Z-Wave Alliance, Bluetooth according to the Special Interest Group and/or a Worldwide Interoperability for Microwave Access (WiMAX) according to the standard family IEEE 802.16.

Moreover, those skilled in the art will appreciate that the functions, steps, units and modules explained herein may be implemented using software functioning in conjunction with a programmed microprocessor, an Application Specific Integrated Circuit (ASIC), a Field Programmable Gate Array (FPGA), a Digital Signal Processor (DSP) or a general purpose computer, e.g., including an Advanced RISC Machine (ARM). It will also be appreciated that, while the following embodiments are primarily described in context with methods and devices, the invention may also be embodied in a computer program product as well as in a system comprising a computer processor and memory coupled to the processor, wherein the memory is encoded with one or more programs that may perform the functions and steps and implement the units and modules disclosed herein.

Figure 1:
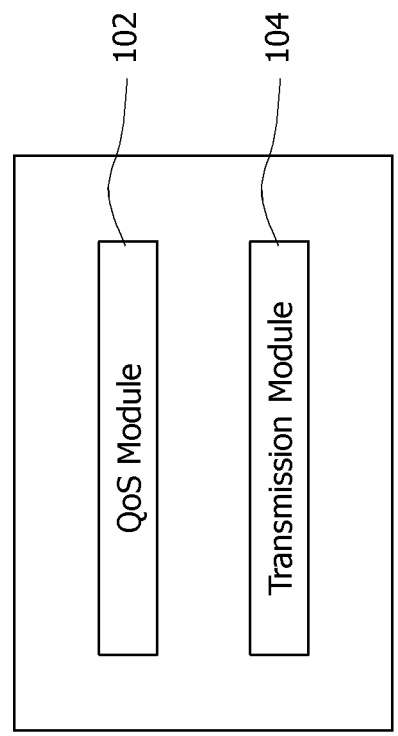
FIGS. 1A and 1B schematically illustrate embodiments of a device for transmitting data in a radio access network.

FIG. 1A schematically illustrates a first embodiment of a device 100 for transmitting data in a radio access network (RAN). The device 100 comprises a determining unit 102, e.g., a processor, adapted to determine Quality of Service (QoS) requirements for the data to be transmitted; and a transmitting unit 104, e.g., a transmitter, adapted to transmit the data using an antenna array for beamforming. Both the beamforming and a transmit power of the data transmission are controlled, e.g., by the processor and/or the transmitter, according to the QoS requirements and within an upper limit for a radiant intensity of the data transmission.

FIG. 1B schematically illustrates a second embodiment of the device 100 for transmitting data in the RAN. The device comprises a QoS module 102 for determining QoS requirements for the data to be transmitted; and a transmission module 104 for transmitting the data using an antenna array for beamforming, wherein both the beamforming and a transmit power of the data transmission are controlled according to the QoS requirements and within an upper limit for a radiant intensity of the data transmission.

Any feature disclosed for the units 102 and 104 can be implemented by the corresponding modules, and vice versa.

Figure 2:
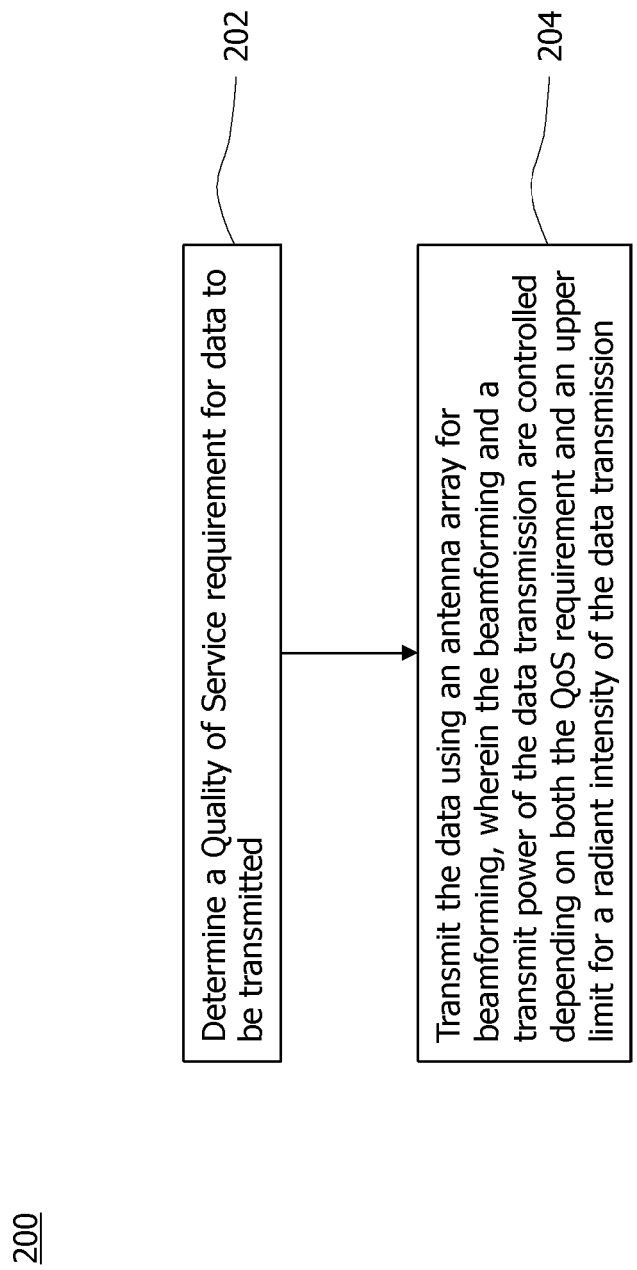
FIG. 2 shows a flowchart for a method of transmitting data in a radio access network, which is performable by the device of FIG. 1.

FIG. 2 shows a flowchart for a method 200 of transmitting data in a RAN. The method 200 comprises or triggers a step 202 of determining QoS requirements for the data to be transmitted; and a step 204 of transmitting the data using an antenna array for beamforming. Both the beamforming and a transmit power of the data transmission are controlled according to the QoS requirements and within an upper limit for a radiant intensity of the data transmission.

The device 100 may perform the method 200. The steps 202 and 204 may be performed by the units 102 and 104, respectively.

The QoS requirements and the upper limit for the radiant intensity may be collectively referred to as transmission requirements. The QoS requirement may include metrics such as throughput (e.g., data rate), reliability and/or robustness against mobility. The reliability and/or the robustness may be quantified in terms of a packet error ratio (PER, also: packet error rate) or a block error ratio (BER, also: block error rate). The QoS requirements may also be referred to as desired QoS targets or traffic QoS demands.

The beamforming (e.g., an antenna beamwidth), the transmit power (e.g., a transmit power level) and, optionally, a modulation-and-coding scheme (MCS) may be collectively referred to as transmission parameters. The upper limit for the radiant intensity of the data transmission may be part of regulations for a spectrum used for the data transmission.

For transmitting the data, the transmission parameters may be controlled depending on the transmission requirements. The transmission parameters may be controlled to fulfill (or satisfy) all of the transmission requirements. All of the transmission parameters may be jointly controlled.

At least one first transmission parameter of the transmission parameters may be controlled depending on the transmission requirements by determining each first transmission parameter as a function of the transmission requirements. Alternatively or in addition, at least one second transmission parameter of the transmission parameters (other than the at least one first transmission parameter) may be determined based on the determined at least one first transmission parameter.

The transmission parameters may be jointly determined or selected so that the transmission requirements are fulfilled without violating the regulations, e.g., on a maximum effective isotropically radiated power (EIRP, also: equivalent isotropically radiated power), power spectral density (PSD) and minimum occupied bandwidth. The joint determination of the transmission parameters may be carried out flexibly according to regulations for a given regional spectrum band. The determination of the transmission parameters may be performed on a per-transmission basis to achieve the required QoS.

The determination or selection of the transmission parameters may further be carried out to optimize the use of the RAN and the radio resources, e.g., given the QoS requirements are satisfied. An example optimization includes reducing the transmit power level to save energy.

Moreover, the transmission parameters may be flexibly and/or dynamically determined during operation, e.g., during the data transmission, e.g., according to the deployment conditions and/or operation conditions (topology of the network, mobility aspects, channel conditions, etc. and their variations) and/or according to device capabilities.

The MCS may be determined based on the transmission parameters (e.g., beamforming and/or transmit power). In order to satisfy the desired QoS targets (e.g., throughput and/or reliability), the joint determination of the transmission parameters may be implemented as additional input to the determination of the MCS. Embodiments may determine the transmission parameters in an adaptive manner, e.g., based on deployment setup, traffic QoS requirements and the subjected channel conditions, e.g., at a given time instant.

The RAN may be a cellular RAN, e.g., a 3GPP cellular network. Alternatively or in addition, the technique may be applied to a non-cellular RAN or other technologies besides 3GPP cellular networks.

The technique may be implemented in cellular base stations and/or user equipments for mobile broadband traffic. Alternatively or in addition, the technique may be implemented for use-cases with a broader range of requirements on reliability, latency and throughput, which require versatile and reconfigurable transmission parameters. For example, the same RAN may provide both mobile broadband access and application-specific QoS requirements based on the QoS determination 202 and by controlling the transmission parameters in the data transmission 204.

The data transmission 204, e.g., in the unlicensed spectrum, may fulfill a maximum transmit power, a maximum radiant intensity (or maximum radiated power), a maximum power spectrum density and/or a minimum occupied bandwidth. These constraints may be interrelated. For example, an increase in beamforming antenna gain may be associated with a reduction of transmit power to fulfill the upper limit on the radiant intensity. The licensed spectrum may also have such limitations (e.g., on transmit power and radiant intensity), wherein limits for the licensed spectrum may be more relaxed compared to the limits for the unlicensed spectrum.

The beamforming gain (or beamforming antenna gain) and the transmit power (or transmit power level) may be controlled (and, optionally, the MCS is determined) in a manner that meets the QoS requirements, is optimal for the network and frequency planning perspective (e.g., optimality in terms of resource utilization), and satisfies the regulatory constraints in the licensed and/or unlicensed spectrum.

The antenna array may comprise a plurality of antenna elements. The antenna may be accessed through antenna ports. Each antenna port may be associated (e.g., connected) with one of the antenna elements or a group thereof. Each antenna element and/or each antenna port may be fed by an antenna signal.

The beamforming may be controlled by a set of (e.g., complex-valued) element gains. Each of the element gains may be associated with a different one of the antenna elements and/or antenna ports. Each of the antenna signals may be multiplied by the associated one of the element gains.

The set of element gains may be part of the transmission parameters. The set of element gains may also be referred to as a beamforming configuration, precoding matrix or steering matrix. Controlling the beamforming may include generating the beamforming configuration.

The expression "antenna array" may encompass any arrangement of the antenna elements. The antenna elements may be arranged on a surface or in a volume. The surface may be flat or curved. The antenna elements may be regularly arranged, e.g., corresponding to points of a Bravais lattice. The lattice may be two-dimensional or three-dimensional.

The radiant intensity may correspond to a directivity of the data transmission. The radiant intensity caused by the antenna array for the data transmission may be anisotropic.

The radiant intensity may be radiation power per solid angle in a certain direction. A maximum of the radiant intensity may be the radiant intensity in the direction of a main lobe.

The radiant intensity, U, may be the power, $dP_{trans}$, transmitted from the antenna array per solid angle $d\Omega = \sin\vartheta d\vartheta d\varphi$. Alternatively or in addition, the radiant intensity, U, may be the electromagnetic irradiance, I, caused by the antenna array multiplied by the square, $r^2$, of the distance, r, from the antenna array.

The anisotropy of the radiant intensity, $U(\vartheta, \varphi)$, may be changed by controlling the beamforming, e.g., by applying the beamforming configuration to the antenna ports.

The limit for the radiant intensity may depend on the carrier frequency used for the data transmission. The limit for radiant intensity may be a regulatory requirement.

The step of determining may further determine the limit for the radiant intensity. The limit for the radiant intensity may be determined for each data transmission or may be predefined for the RAN (e.g., at deployment of the RAN).

The QoS requirements and/or the limit for the radiant intensity may be changed during the data transmission. For example, the step of transmitting the data may encompass two or more transmission phases (e.g., a pre-transmission phase and/or two or more signal transmission phases). The QoS requirements and/or the limit for the radiant intensity may be different in different transmission phases.

The RAN may include a plurality of stations. At least one of the stations may transmit the data. The transmitting station may perform the method. One or more other stations of the RAN may receive the data.

The stations in the RAN may be spaced apart. The beamforming and/or the transmit power (or any other transmission parameter) may be controlled depending upon a distance between the transmitting station and the one or more receiving stations.

The transmitting station may include and/or control the antenna array for the beamforming, e.g., by applying the beamforming configuration in the data transmission. The radiant intensity may be determined (within the upper limit) depending upon a hardware capability of the transmitting station and/or a hardware capability of the one or more receiving stations.

The beamforming may be controlled to change the anisotropy of the radiant intensity. The beamforming may be an adaptive beamforming. The anisotropy of the radiant intensity may be adapted to a channel condition and/or in response to channel information (e.g., channel state information or an indicator of the precoding matrix) from the receiving station.

The beamforming may generate multiple beams. The multiple beams may be simultaneously transmitted. Each of the multiple beams may be independently controlled according to the method. E.g., a beamforming configuration may be generated according to the method for each of the multiple beams.

The data may be transmitted to one or more receiving stations, e.g., for a unicast transmission and a multicast transmission, respectively. Optionally, the link quality may be estimated or reported for each of the receiving stations. In this case, the transmission parameters (e.g., the transmit power and the beamforming gain) may be controlled to satisfy the least link quality (e.g., the worst case among the receiving stations). Alternatively, the control is based on an average of the different link qualities case. A system operator may define the combination of the different link qualities for controlling the transmission parameters.

For example, the same data may be simultaneously transmitted to each of the multiple receiving stations. Each of the multiple beams may be directed towards one of the multiple receiving stations. The beam configuration may be a linear combination of multiple beamforming configurations, each of which is determined for one of the beams or for one of the multiple receiving stations.

Alternatively or in addition, multiple beams may be directed to one receiving station. Different data or different portions of the data may be transmitted on different beams or spatial streams, e.g., for a spatial multiplexing transmission. Each of the spatial streams may use a different one (or more) of the multiple beams.

Alternatively or in addition, the same transmitting station may perform the method for each of the multiple receiving stations. The transmitting station may transmit, to each of the receiving stations, station-specific data, e.g., for a multiple user (MU) beamforming transmission or a MU-Multiple Input Multiple Output (MU-MIMO) transmission.

The carrier frequency for the data transmission 204 may be equal to or greater than 6 GHz. Alternatively or in addition, the data transmission 204 may use unlicensed spectrum.

The technique is applicable to both licensed and unlicensed spectrum. For example, the RAN may use licensed spectrum below 6 GHz licensed spectrum and unlicensed spectrum above 6 GHz. Alternatively or in addition, the "unlicensed spectrum" may encompass spectrum that is not allocated to any specific wireless standard.

The data may be transmitted in the unlicensed spectrum (e.g., in the spectrum above 6 GHz) within the upper limit. Simultaneously, further data may be transmitted in the licensed spectrum (e.g., in the spectrum below 6 GHz) without the upper limit or within another upper limit greater than the upper limit.

The beamforming may be controlled in higher carrier frequencies (e.g., centimeter and millimeter wavelengths). The technique may be compatible with existing radio access technologies (RATs), e.g., using wireless spectrum below 6 GHz (such as LTE, Wi-Fi, ZigBee, Bluetooth, etc.).

Adaptive beamforming and/or power control may be selectively carried out depending on the frequency band of the data transmission 204, for example in the spectrum above 6 GHz. Alternatively or in addition, adaptive beamforming and/or power control on a granular basis (e.g., per transmission) may be selectively carried out depending on the frequency band of the data transmission 204, for example in the spectrum above 6 GHz.

The RAN may provide ubiquitous coverage and seamless mobility (e.g., for mobile broadband services) using a first range of radio frequencies, e.g., radio frequencies less than 3 GHz or less than 6 GHz. The data transmission may use a second range of radio frequencies, e.g., including frequencies equal to or greater than 3 GHz or 6 GHz, millimeter wavelengths or frequencies up to 60 GHz or 100 GHz, e.g., 28 GHz.

Such wavelengths may enable the use of a greater number of antenna elements in the antenna array in a relatively small form factor, e.g., for mobile devices.

The data transmission may be implemented in a 5G New Radio. The data transmission may boost data throughput, increase network capacity reduce latency and/or increase robustness (e.g., for stationary applications). The RAN may use a unified radio interface, e.g., at the transmitting station, configured to control radio access in both the first range of radio frequencies and the second range of radio frequencies.

The data may be transmitted from a transmitting station in the RAN. The data may be transmitted to a receiving station in the RAN.

At least one of the transmitting station and the receiving station may be a node of the RAN. The node may provide radio access to a plurality of stations in the RAN.

At least one first station of the stations may be or may include functionality of a node, a base station or an access point of the RAN. The first station may define a coverage area, e.g., a cell or a basic service set, of the RAN.

At least one second station of the stations (e.g., among the stations other than the first station) may be or may include functionality of a wireless device, a user equipment (UE) or a mobile station. The second station may be, e.g., movably, located within the coverage area or may be mobile between different coverage areas. For example, the second station may be implemented by a wirelessly connected vehicle (e.g., a car or train). Alternatively or in addition, the second station may be configured for machine-type communication (MTC). For example, the second station may be implemented in a sensor or actuator.

The first station may be the transmitting station, and the second station may be the receiving station (which may also be referred to as a downlink data transmission), or vice versa (which may also be referred to as an uplink data transmission). Alternatively or in addition, one of the second stations may be the transmitting station, and another one of the second stations may be the receiving station (which may also be referred to as device-to-device communication). The RAN may comprise only second stations.

The QoS requirements may relate to data throughput, reliability, robustness against motion (e.g., fast or slow fading due to motion of a receiving station relative to a transmitting station), robustness for mobility (e.g., handover between cells or service sets of the RAN), latency, jitter and/or error rates. The QoS requirements may include a minimum data rate and/or a maximum error rate (for bit, block or packets).

The upper limit for the radiant intensity may be isotropic. The upper limit for the radiant intensity may require that the radiant intensity of the data transmission be below the upper limit in all directions.

The radiant intensity $U(\vartheta, \varphi)$ may be the power that is transmitted from the antenna array per solid angle in a direction $(\vartheta, \varphi)$. The upper limit, $U_{max}$, for the radiant intensity may be independent of the direction $(\vartheta, \varphi)$.

The upper limit for the radiant intensity may define a maximum of the (e.g., time-averaged) magnitude (or absolute value) of a Poynting vector of the data transmission. The upper limit may define a maximum for the (e.g., time-averaged) Poynting vector multiplied by the square of the distance from the antenna array (e.g., multiplied by $4\pi r^2$, wherein the distance is r).

The upper limit for the radiant intensity may be defined by at least one of an Effective Radiated Power (ERP) and an Equivalent Isotropically-Radiated Power (EIRP). The EIRP may be equal to the upper limit for the radiant intensity multiplied by $4\pi$. A value, $P_{iso}$, for the EIRP may be specified in watts (W) or milliwatts (mW). Alternatively or in addition, the EIRP may be logarithmically specified, e.g., as x dBm, wherein $x=10 \cdot \log_{10}(P_{iso}/1 \text{ mW})$. For example, 36 dBm may correspond to $P_{iso}=4$ W. Analogously, a value $P_{dip}$ for the ERP may be specified in W or mW, or logarithmically as x dBm, wherein $x=10 \cdot \log_{10}(P_{dip}/1 \text{ mW})$.

The upper limit for the radiant intensity may be defined in power per solid angle, e.g., using a maximum value for the radiant intensity over all directions $(\vartheta, \varphi)$. The upper limit for the radiant intensity may be specified in terms of watts (or milliwatts) per steradian. Alternatively or in addition, the upper limit for the radiant intensity may be expressed in watts (or milliwatts), e.g., using a value for the ERP or the EIRP. The upper limit for the radiant intensity may be defined in equivalent isotropic watts (or milliwatts) and/or equivalent isotropic decibel-milliwatts.

The beamforming may define a beamforming gain. The beamforming gain may be defined as the maximum of a directional beamforming gain over all directions or as an antenna gain of the antenna array (e.g., for a given beamforming configuration). The directional beamforming gain may be a function of a direction $(\vartheta, \varphi)$ relative to the transmitting station. The beamforming gain may include an electrical efficiency of the antenna array.

Any "gain" may be specified in units of dBi or dBd. Any "gain" may be defined with respect to a hypothetical antenna that radiates equally in all directions, which is also referred to as an isotropic radiator. The directional beamforming gain, $G(\vartheta, \varphi)$, may be defined as a ratio of the radiant intensity, $U(\vartheta, \varphi)$, and the transmit power over the unit sphere, $P_{trans}/4\pi$. The "gain" defined relative to an isotropic radiator may be specified in units of dBi. Alternatively, any "gain" may be defined relative to the radiation of a half-wavelength dipole (or Hertz dipole), which may be specified in units of dBd, wherein (x+2.15) dBi=x dBd.

The product of the transmit power and the beamforming gain may be limited by the upper limit for the radiant intensity. The product of the transmit power and the beamforming gain may be equal to or less than the EIRP limit. The EIRP limit may be the upper limit in terms of the EIRP or the maximum allowable EIRP. The "EIRP limit" may also be referred to as the "EIRP" for brevity. For a beamforming gain including the electrical efficiency of the antenna array, the product of amplifier power and the beamforming gain may be equal to or less than the EIRP. Using a logarithmic scale (e.g., a decibel scale), the sum of a value for the transmit power and a value for the beamforming gain may be equal to or less than a value for the EIRP.

The beamforming may define a beamwidth. Alternatively or in addition, the beamforming may be controlled according to a beamwidth. The antenna array may be operated according to the beamwidth. The term "beamwidth" may encompass any measure for anisotropy in the data transmission. The beamwidth may be realized by means of the beamforming.

The beamwidth may be the solid angle of a cross-sectional area or lobe through which the antenna array transmits the data. The cross-sectional area may be bounded or delimited by points of half of a peak radiant intensity in the cross-sectional area or in the lobe.

Figure 3:
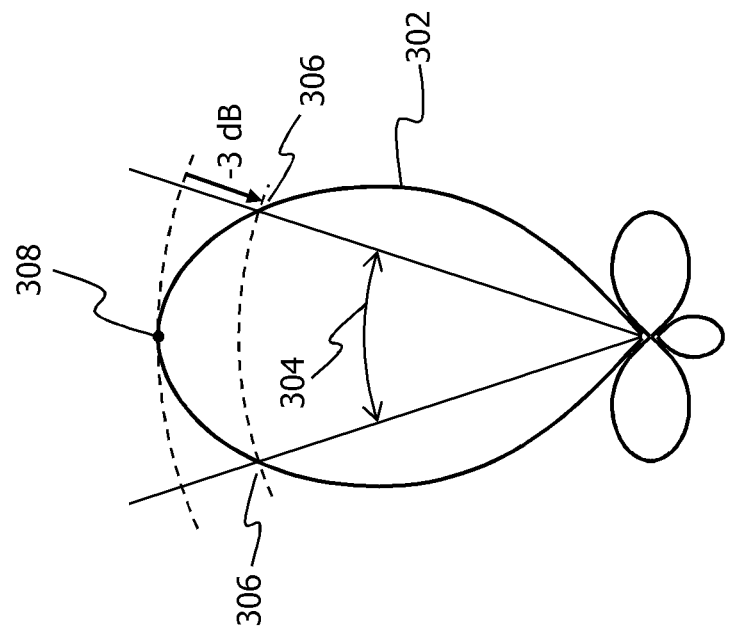
FIG. 3 shows a schematic plot of a radiant intensity of a data transmission, which is performable by the device of FIG. 1.

FIG. 3 illustrates an example definition for the beamwidth. The diagram 300 in FIG. 3 shows a schematic polar plot of the radiant intensity 302 (or, equally for the purpose of defining the beamwidth, the directional beamforming gain). The beamwidth 304 may be the solid angle subtended by points 306 through which the radiant intensity 302 (or the directional beamforming gain) is 3 dB less than the radiant intensity 302 in the direction of a local peak or the strongest direction 308 of the radiant intensity 302 (or the beamforming gain) of the antenna array.

The beamwidth may be less than $4\pi/50$, e.g., less than $4\pi/100$. The antenna array may comprise more than 100 antenna elements, e.g., more than 200 antenna elements. In units of a wavelength and/or the number of antenna elements, a size of the antenna array may be proportional to the beamforming gain (i.e., the maximum of the directional beamforming gain), e.g., according to a diffraction limit.

Beamwidth and beamforming gain may be negatively correlated. For example, the beamforming gain may be inversely proportional to the beamwidth. A greater beamforming gain may correspond a reduced beamwidth (or narrower beam), e.g., due to conservation of energy. For example, if a beamforming gain G>1 and a transmit power $P_{trans}$ cause a radiant intensity U (in the direction of the main lobe) corresponding to an isotropic transmitter with transmit power $G \cdot P_{trans}$, the main lobe can cover at most 1/G<1 of the sky, i.e., the beamwidth is 4π/G or less.

Figure 4:
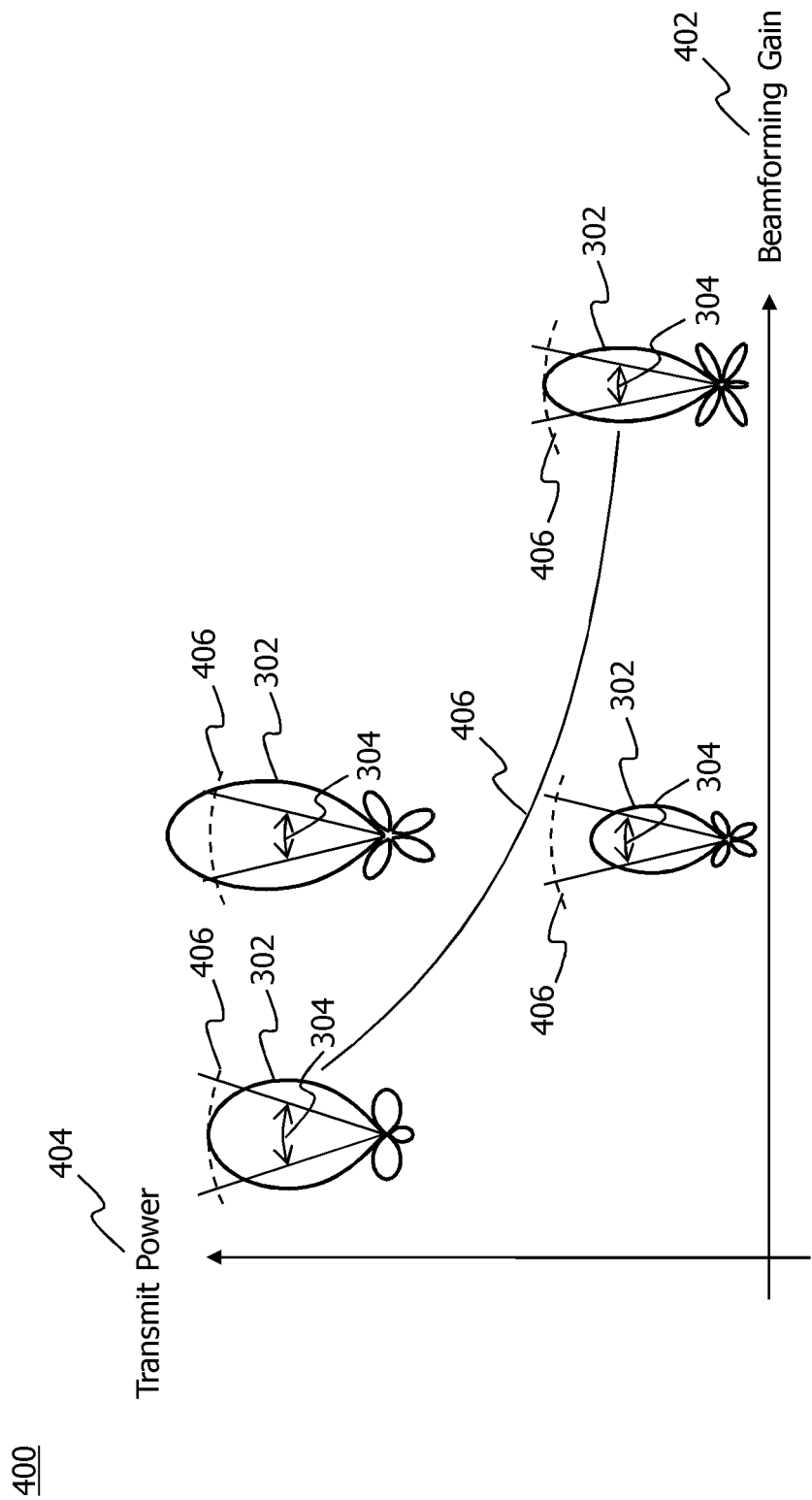
FIG. 4 schematically illustrates combination of transmission parameters, which are controllable by the device of FIG. 1.

The diagram 400 in FIG. 4 schematically illustrates exemplary polar plots of the radiant intensity 302 as a function of the beamforming gain 402 (i.e., the maximum of the directional beamforming gain) on the horizontal axis. The beamwidth 304 decreases as the beamforming gain 402 increases.

The beamwidth 304 may be independent of the transmit power 404 (on the vertical axis in the diagram 400). The radiant intensity 302, in each direction, may be proportional to the transmit power 404.

In the polar plots, the upper limit 406 for the radiant intensity 302 corresponds to a sphere (a dashed segment of which is shown in each of the polar plots in FIG. 4). In the diagram 400, combinations of the beamforming gain 402, G, and the transmit power 404, $P_{trans}$, that fulfill the upper limit 406 are below the curve EIRP=$G \cdot P_{trans}$, which represents the upper limit 406 in the diagram 400.

The beamwidth 304 may be reduced to increase frequency reuse, e.g., directional frequency reuse. E.g., the beamwidth may be reduced as the number of stations in the RAN or in a cell of the RAN increases.

The QoS requirement may be indicative of a lower limit for the beamwidth 304 or may imply the lower limit for the beamwidth 304. For example, the QoS requirement may require certain robustness under motion or mobility. The robustness may require or imply the lower limit for the beamwidth 304.

The QoS requirement may be indicative of at least one of robustness of the data transmission and mobility of a station receiving the data transmission. The beamwidth 304 may be increased as the robustness increases, and/or the beamwidth 304 may be decreased as the mobility decreases.

The transmission requirements may further include at least one of an upper limit for the transmit power 404, an upper limit for the power spectral density and a minimum occupied bandwidth. The minimum occupied bandwidth includes, for instance, a minimum limit on the occupation of the bandwidth below which a transmitting station is not permitted to carry out the data transmission.

By way of example, for the 5 GHz spectrum used by WLAN, regulations defined by part 15 of FCC Rules in the USA state that within the 5.725-5.85 GHz band, the minimum 6 dB bandwidth (ca. 75% of the signal bandwidth) occupied by an Unlicensed National Information Infrastructure (U-NII) device shall be at least 500 kHz. There are regulations for the minimum occupied bandwidth in Europe and elsewhere, as well as for other spectra.

The data transmission 204 may use an MCS depending at least one of the transmission parameters and the transmission requirements. For example, the MCS of the data transmission 204 may be determined based on at least one of the QoS requirement, the upper limit 406 for the radiant intensity 302, the beamforming (e.g., the beamwidth 304 and/or the beamforming gain 402) and the transmit power 404. Alternatively or in addition the transmission parameters may further include one or more parameters indicative of the MCS.

The antenna signal may be computed and/or controlled according to at least one of a modulation scheme, a coding scheme, the beamforming (e.g., the beamforming configuration using the element gains) and the transmit power 404.

The transmit power 404 and the beamforming (e.g., the beamforming configuration, the beamwidth 304 and/or the beamforming gain 402) may define or allow estimating a link quality. The link quality defined and/or estimated for the data transmission 204 from the transmitting station to the at least one receiving station may also be referred to as a target link quality. The target link quality may be defined and/or estimated based on a reference link quality (e.g., a reference value of the link quality).

The link quality (e.g., the target link quality and/or the reference link quality) may include an indicator of a signal quality. The link quality (e.g., the target link quality and/or the reference link quality) may include a signal-to-noise ratio (SNR), a ratio of signal to noise and interference (SNIR), a ratio of noise to interference (SIR). The link quality (e.g., the target link quality and/or the reference link quality) may include a combination (e.g., a weighted linear combination) of any one of the ratios.

For the reference link quality, the signal in any one of these ratios may be the signal of a reference signal, e.g., as received at the receiving station from the transmitting station (e.g., in a frequency-division duplex mode) and/or as received at the transmitting station from the receiving station (e.g., in a time-division duplex mode). For the target link quality, the signal in any one of these ratios may be the signal of the data transmission 204 as received at the receiving station from the transmitting station.

Alternatively or in addition, the link quality (e.g., the target link quality and/or the reference link quality) may be a function of a channel quality indicator (CQI), a reliability (e.g., PER and/or BER), observed spectral interference levels, a Precoding Matrix Indicator (PMI), a rank indicator (RI) or a combination (e.g., a weighted linear combination) thereof.

Alternatively or in addition, the data may be transmitted in the step 204 on one or more radio channels of the RAN. The link quality (e.g., the target link quality and/or the reference link quality) may be a function of channel state coefficients of the one or more radio channels. The antenna array may be operated or the beamforming configuration may be determined depending on the channel state coefficients in the data transmission 204.

The link quality (e.g., the target link quality and/or the reference link quality) may be a scalable measure. The link quality (e.g., the target link quality and/or the reference link quality) may scale linearly with the beamforming gain 402 and/or the transmit power 404.

The reference link quality may be derived from a report, e.g., received from the receiving station prior to the data transmission 204. The report may be based on a reference transmit power and/or a reference beamforming configuration (e.g., a reference beamwidth, a reference beamforming gain, or an isotropic transmission) used by the transmitting station, e.g., when transmitting the reference signal.

The method may further comprise or trigger a step of transmitting the reference signal to the receiving station; and a step of receiving the report based on the reference signal from the receiving station. The station transmitting the data may transmit the reference signals, e.g., if the transmitting station and the receiving station communicate in a frequency-division duplex mode and/or if no data is received from the receiving station.

The report may be indicative of at least one of the reference link quality and the MCS. The report may indicate the reference link quality by indicating the MCS according to a mapping between link quality and MCS (e.g., a mapping of the SNR to the MCS). The report may include the CQI. The reference link quality that is indicated or implied in the report received at the transmitting station may also be referred to as the reported link quality.

Alternatively or in addition, the station transmitting the data may receive the reference signal from the station receiving the data, e.g., if the transmitting station and the receiving station communicate in a time-division duplex mode.

The method may further comprise or trigger a step of receiving reference signals from the receiving station; and at least one of estimating the reference link quality and determining the MCS based on the received reference signals. The reference link quality that is estimated at the transmitting station may also be referred to as the estimated link quality.

Controlling the transmit power 404 of the data transmission 204 may include scaling the reference transmit power based on at least one of the estimated link quality and the reported link quality.

The reference signal may be transmitted (by the transmitting station, e.g., in a frequency-division duplex mode; or by the receiving station, e.g., in a time-division duplex mode) using the reference transmit power. The reference transmit power may correspond to a maximum for the transmit power 404 or a middle level for the transmit power 404.

The transmit power 404 and the beamforming (e.g., the beamforming configuration, the beamwidth 304 and/or the beamforming gain 402) may be controlled for the data transmission 204 so as to achieve the target link quality. For example, the transmit power 404 and the beamforming gain 402 for the data transmission may be computed by multiplying the reference transmit power, $P_{reference}$, and/or the reference beamforming gain, $G_{reference}$, with a ratio of the target link quality to the reference link quality.

In one embodiment, the reference link quality (e.g., the SNR) may be at least one of estimated and reported for each of a plurality of configurations of the beamforming using the reference signal or reference signals. The beamforming may be controlled in the step 204 according to one of the beamforming configurations. The one of the beamforming configurations may be determined based on the QoS requirements. The transmit power 404 in step 204 may result from scaling the reference transmit power based on the reference link quality (e.g., the estimated or reported SNR) corresponding to the one of the beamforming configurations.

In another embodiment, the reference link quality (e.g., the SNR) may be at least one of estimated and reported based on the reference signal transmitted with the reference transmit power using a reference beamforming configuration defining a reference beamforming gain. The beamforming may be controlled in the data transmission 204 according to a beamforming configuration other than the reference beamforming configuration. The other beamforming configuration may be determined based on the QoS requirements. Controlling the transmit power 404 in the step 204 may include scaling the reference transmit power based on at least one of the reference link quality and a target beamforming gain 402 defined by the other beamforming configuration (e.g., a ratio of the target beamforming gain to the reference beamforming gain).

As a further embodiment, which is combinable with each of above embodiments, a reference link quality, $LQ_{reference}$, may be reported from the receiving station (e.g., in a frequency-division duplex mode) or determined by the transmitting station (e.g., in a time-division duplex mode). Based on a ratio, $$\frac{LQ_{target}}{LQ_{reference}},$$

of the target link quality, $LQ_{target}$, to the reference link quality, $LQ_{reference}$, the beamforming gain 402 for the step 204 may be computed according to $$G = G_{reference} \cdot \left(\frac{LQ_{target}}{LQ_{reference}}\right)^{\alpha}, \quad (1)$$

and the transmit power 404 for the step 204 may be computed according to $$P_{trans} = P_{reference} \cdot \left(\frac{LQ_{target}}{LQ_{reference}}\right)^{1-\alpha}. \quad (2)$$

Herein, the value $\alpha$ is an additional degree of freedom for controlling the data transmission 204. For example, the beamwidth 304 may be controlled by means of the value $\alpha$.

The value $\alpha$ may be determined within the interval $0 \leq \alpha \leq 1$. Alternatively or in addition, the value $\alpha \in \mathbb{R}$ may be determined within an interval that is limited by the upper limit for the transmit power 404.

The value of $\alpha$ and the value of the target link quality, $LQ_{target}$, may be determined (e.g., jointly or separately) by the QoS requirements. E.g., the throughput of the QoS requirements may imply the target link quality, $LQ_{target}$, and/or the robustness or reliability of the QoS requirements may imply the beamwidth 304 or the value $\alpha$. By way of example, the beamwidth 304 may be computed or estimated according to $$beamwidth \approx \frac{4\pi}{G_{reference}} \cdot \left(\frac{LQ_{target}}{LQ_{reference}}\right)^{-\alpha}.$$

The MCS may be determined based on the link quality (e.g., the target link quality, particularly the target for the SNR) and the QoS requirement. The QoS requirements may be indicative of at least one of throughput (e.g., data rate), reliability and robustness. Each MCS out of a plurality of a set of possible MCSs may be associated with a minimum for the link quality (e.g., the SNR). The MCS may be determined to comply with at least one of the QoS requirements and the minimum for the link quality.

Each of the beamforming configurations may define a different one of a plurality of beamwidths 304 and/or beamforming gains 402.

The QoS requirement may imply at least one MCS. The implied MCS may require a minimum link quality (e.g., SNR). The beamforming and the transmit power 404 are controlled in the step 204 to fulfill both the minimum link quality and the upper limit for the radiant intensity.

For example, the QoS requirement may (e.g., expressly or implicitly) require one or more MCSs, e.g., in order to achieve the data rate and/or the reliability. The one or more MCSs may require the minimum link quality, e.g., in order to achieve the data rate and/or to fulfill a limit for the error rate (for bits, blocks or packets).

At least one of the QoS requirement and the upper limit for the radiant intensity of the data transmission are determined for each data transmission. The control parameters may be determined for each data transmission and/or radio frame or subframe.

While terminology from 3GPP New Radio is used in this disclosure to exemplify the invention, the technique is not limited to such RANs. Any RAN or wireless system may also benefit from applying the technique.

Furthermore, terminologies such as base station (BS) or node (e.g., eNodeB), on the one hand, and mobile device, terminals or user equipment (UE), on the other hand, should be considered non-limiting examples for stations of the RAN. In particular, while the technique may allow implementing a hierarchical relation between the two in the RAN, such terminology does not limit the technique to hierarchal implementations. An "eNodeB" may be any first station, and a "UE" may be any second station other than the first station, wherein the first and second stations may communicate with each other over some radio channel.

Embodiments described herein are not mutually exclusive. For example, features from one embodiment may be tacitly assumed to be present in another embodiment. Alternatively or in addition, a person skilled in the art will appreciate using those features in the other exemplary embodiments.

RANs of the fourth generation (4G) are particularly useful for mobile broadband (MBB) traffic. Use cases for RANs of the fifth generation (5G) have varying QoS requirements, e.g. according to different applications causing the traffic. For example, the RAN may not only serve MBB but also fulfill QoS requirements for high reliability and/or low-latency. Alternatively or in addition, the RAN may be scalable to a large number of terminals. The technique can be implemented to meet the varying QoS requirements by adaptability (e.g., by determining transmission parameters in response to the reference link quality) and/or flexibility (e.g., by performing the QoS determination 202 with per-transmission granularity). The flexibility or reconfiguration (e.g., of the beamforming configuration) enable optimally transmission parameters in order to achieve the desired QoS targets.

The link quality may associate different weights with different link quality factors that influence a combined link quality. The weights of the combined link quality may depend on the QoS requirements. For example, the QoS requirements for data in MBB may include the highest weight on factors for throughput, while the QoS requirements for other data transmission (e.g., in the same RAN or by the same transmitting station) may include the highest weight on factors for reliability. Alternatively or in addition, the same target link quality, e.g., a gain in the SNR, may be used in combination with different MCSs depending on the QoS requirements. For example, a lower MCS value (compared to an MCS value carried out for the MBB data transmission at the given SNR) may be used in order to achieve a more robust and/or reliable data transmission 204, e.g., with very low PER.

RANs according to 3GPP (e.g., prior to 3GPP Release 13) operate in the licensed spectrum, in which no strict regional spectrum sharing regulations and constraints apply. Since Release 13, 3GPP LTE includes License-Assisted Access (LAA). The LTE operation in the unlicensed spectrum fulfills regulations in the unlicensed spectrum. The technique is implementable with LAA. Alternatively or in addition, the technique may be implemented with dynamic frequency selection (DFS) and/or advanced controls for the antenna array, the transmit power and the beamforming in the step 204.

In licensed spectrum, the upper limit 406 for the radiant intensity 302 (e.g., the EIRP) and/or the limit for the transmit power 404 may be absent or higher as compared to unlicensed spectrum. In unlicensed spectrum, any one of these limits may vary from region to region and/or may depend on the frequency band or even sub-band. The limits can allow for coexistence and spectrum sharing with other devices, and avoid interference with other devices and networks.

EIRP is the product of transmitter power and the antenna gain in a given direction relative to an isotropic antenna of a radio transmitter. For the beamforming, the product (or on a logarithmic scale, the sum) of total RF power, antenna gain and beamforming gain should be less than the EIRP limit 406. In Europe, the EIRP limit 406 for the (unlicensed) 5 GHz band may be 23 dBm for 5150-5250 MHz, 23 dBm and 20 dBm for 5250-5350 MHz with respectively without Transmission Power Control (TPC), and 30 dBm and 27 dBm for 5470-5725 MHz with respectively without Transmission Power Control (TPC). In the USA, the EIRP limit 406 for the (unlicensed) 5 GHz band may be 36 dBm for both 5150-5250 MHz and 5725-5825 MHz, and 30 dBm and 27 dBm with respectively without Transmission Power Control (TPC) for both for 5250-5350 MHz and 5470-5725 MHz. In the USA, the limit for the RF output power 404 for the (unlicensed) 5 GHz band may be 30 dBm for both 5150-5250 MHz and 5725-5825 MHz, and 24 dBm and 21 dBm with respectively without Transmission Power Control (TPC) for both for 5250-5350 MHz and 5470-5725 MHz. In China, the EIRP limit 406 for the (unlicensed) 5 GHz band may be 23 dBm for 5150-5250 MHz, 23 dBm and 20 dBm for 5250-5350 MHz with respectively without Transmission Power Control (TPC), and 33 dBm for 5725-5825 MHz.

The carrier frequencies (e.g. cm or mm wavelengths) for the unlicensed spectrum may be higher than the carrier frequencies for the licensed spectrum. While radio propagation conditions may decrease with the carrier frequency, the size of the antenna array for the beamforming decreases. The beamforming gains 402 (also: antenna directivity gains) can be used to compensate for higher propagation losses.

In the step 204, transmit power 404, beamforming gain 402 and, optionally the MCS, are jointly determined. The transmission parameters 402 and 404 are jointly controlled to achieve the target link quality (e.g., the target SNR) at the receiving station. The QoS requirements (e.g., reliability and/or throughput) are achieved through appropriate selection of the MCS. The MCS may be selected based on the QoS requirements. The selected MCS may determine the target link quality.

The radio frequency transmission 204 does not violate the spectral regulations. The EIRP limit 406 puts a constraint on the combination of transmit power 404 and beamforming gain 402.

Below Table 1 includes exemplary combinations of the beamforming gains 402 (written in units of "α") and the transmit power levels 404 (written in units of "β") that effect the EIRP in the data transmission 204.

| | Beamforming gains 402 (decreasing from left to right) | | | | |
|---|---|---|---|---|---|
| Transmit power 404 (decreasing from top to down) | α, β | *0.8 α, β* | *0.6 α, β* | 0.4 α, β | 0.2 α, β |
| | α, *0.8 β* | *0.8 α, 0.8 β* | 0.6 α, 0.8 β | 0.4 α, 0.8 β | 0.2 α, 0.8 β |
| | α, *0.6 β* | 0.8 α, 0.6 β | 0.6 α, 0.6 β | 0.4 α, 0.6 β | 0.2 α, 0.6 β |
| | α, 0.4 β | 0.8 α, 0.4 β | 0.6 α, 0.4 β | 0.4 α, 0.4 β | 0.2 α, 0.4 β |
| | α, 0.2 β | 0.8 α, 0.2 β | 0.6 α, 0.2 β | 0.4 α, 0.2 β | 0.2 α, 0.2 β |

The combinations written in upright font represent allowed combinations. The entries in italic font correspond to combinations of the transmission parameters 402 and 404 that are not permitted according to regional spectrum regulatory constraints.

For transmitting the reference signal, an allowed combination of reference transmit power and reference beamforming gain (e.g. $G=0.6\alpha$, $P_{trans}=0.6\beta$) may be used.

At least one of the units α, β, the reference transmit power and the reference beamforming gain are flexibly set (e.g., at deployment or manufacturing) depending upon the regional regulations and the carrier frequency band. The transmission parameters 402 and 404 for the data transmission 204 are controlled (e.g., during operation or transmission) depending upon the regional regulations and the carrier frequency band.

For example, a conservative MCS is selected and later the transmission parameters 402 and 404 are optimized according to the observed or assessed link quality (e.g., the reference link quality). This allows adapting the transmission parameters 402 and 404 based on the observed or assessed link quality in a given deployment setup taking into account the traffic QoS requirements. Thus, varying QoS requirements can be supported.

In an implementation of the step 204, the link quality is based on the weighted combination of a number of link quality factors. The factors may include the CQI (or a similar factor), reliability (e.g., PER or BER), interference levels, PMI (or a similar factor), RI, etc. For example, the link quality, LQ, (e.g., the target link quality for the transmission 204 and/or the reference link quality for scaling the transmission parameters) may be computed in accordance with $$LQ = w_1 \cdot P_1 + w_2 \cdot P_2 + w_3 \cdot P_3 + w_4 \cdot P_4 + \ldots + w_i \cdot P_i. \quad (3)$$

Herein, the (e.g., reported or measured) link quality factors $P_1, P_2, \ldots, P_i$, influence the link quality, and $w_1, w_2, \ldots, w_i$ are their corresponding weights indicating the importance of the respective factors. The values for the weights are in the range [0, 1] and are normalized so that their sum equals to 1, $\Sigma_i w_i = 1$.

The weights are pre-selected, e.g., based on a network scenario. Alternatively or in addition, the weights are adapted according to the varying QoS requirements and/or channel conditions.

As a non-limiting example, the link quality factors, ($P_i$, e.g. for $i=1, \ldots, 4$) may include one or more of the following indicators. $P_1$ indicates the inverse of spectral interference (i.e., cleanliness) of the channel. $P_2$ indicates reliability (e.g., packet receive-to-error ratio, block receive-to-error ratio, etc.). $P_3$ indicates the CQI (or similar indicators) reported from one or more stations (e.g., one or more receiving stations). $P_4$ indicates the PMI (or similar indicators). Other factors may include, for instance, the RI, signal distortion indicators, etc.

In the above definition of the link quality is flexible, e.g., by setting the weights of unavailable factors to zero weight.

Optionally, the transmission parameters are set to accommodate mobility aspects. The beamforming gain 402, the transmit power level 404 and the MCS are determined based on the QoS requirements for the data. The determination may affect the amount of interference on the channel (e.g. caused by collocated networks or stations using another RAT) and/or the sensitivity of the link quality to mobility or movement of one or more receiving stations.

As one example, if the receiving station has (e.g., relative to other stations) little mobility, a relatively narrow beam (or decreased beamwidth 304) with high directivity gain (or increased beamforming gain 402) may be used in the transmission 204. Thus, the transmission 204 consumes less transmit power 404 and, hence, the energy consumption to achieve the same QoS requirement is reduced. As another example, a wider beamwidth (or increased beamwidth 304) is determined, if the QoS requirements require robustness against mobility. In the latter case, for the given target link quality (e.g., the SNR) at the receiving station, a higher transmit power may be necessary.

In one embodiment, the determination of the beamwidth 304, the transmit power 404 and the MCS may be pre-configured as a function of the operating band, of the QoS requirements (e.g., for the target use case or as a function of the data to be transmitted) and/or of the (actual) deployment setup of the RAN.

In another embodiment, the determination may be dynamically performed and/or adapted, e.g., on a per-transmission basis. In other words, the transmission parameters can be configured on a per-transmission basis (e.g., frame-based, etc.). Alternatively or in addition, the transmission parameters may further be optimized for link adaptation. Conventionally, if the link quality is observed to be deteriorated, a relatively robust MCS is selected, and vice-versa. The technique may be implemented by controlling the transmit power 404 and the beamforming gain 402 to improve the link quality (to achieve a higher SNR) in order to meet the QoS requirements of the data to be transmitted. This is carried out while satisfying the regulatory requirements on the maximum EIRP limit 406.

If the deployment is less sensitive to mobility, increasing the beamforming gain 402 is preferred over increasing the transmit power 404 (e.g., by $\alpha > 0.5$ in above Equations (1) and (2)) to achieve the target link quality (e.g., SNR targets), because this beamforming configuration leads to lower energy consumption and/or reduces the effective region of potential interference to collocated stations.

The technique may be applied to downlink (DL) transmissions 204 and/or to uplink (UL) transmissions (e.g., in case the receiving station has beamforming capabilities). Furthermore, the technique may be applied for any kind of transmission (e.g., MTC) occurring between two or more stations (or devices) of the RAN.

The combination of the transmission parameters 402 and 404 may define or allow estimating the (e.g., target) link quality (e.g., the CQI and/or the SNR). A mapping may provide the target link quality for given transmission parameters. The mapping may be stored in a mapping table at the transmitting station performing the method.

For each data transmission 204, the channel between transmitting station and receiving station may be different (e.g., due to different beamforming configurations and/or mobility). Hence, the mapping may be transmission-specific.

For example, the mapping may be generated based on the (e.g., estimated or reported) reference link qualities $LQ_i$ for a plurality of different beamforming configurations (e.g., i=1, . . . , 5).

Below Table 2 provides a schematic example for the mapping.

|  | Beamforming gain 402 | | | | |
| --- | --- | --- | --- | --- | --- |
|  | α | 0.8 α | 0.6 α | 0.4 α | 0.2 α |
| Transmit β | $LQ_1$ | $LQ_2$ | $LQ_3$ | $LQ_4$ | $LQ_5$ |
| Power 404 0.8 β | 0.8 $LQ_1$ | 0.8 $LQ_2$ | 0.8 $LQ_3$ | 0.8 $LQ_4$ | 0.8 $LQ_5$ |
| 0.6 β | 0.6 $LQ_1$ | 0.6 $LQ_2$ | 0.6 $LQ_3$ | 0.6 $LQ_4$ | 0.6 $LQ_5$ |
| 0.4 β | 0.4 $LQ_1$ | 0.4 $LQ_2$ | 0.4 $LQ_3$ | 0.4 $LQ_4$ | 0.4 $LQ_5$ |
| 0.2 β | 0.2 $LQ_1$ | 0.2 $LQ_2$ | 0.2 $LQ_3$ | 0.2 $LQ_4$ | 0.2 $LQ_5$ |

$LQ_1$ to $LQ_5$ are the reference values for the link quality (i.e., the reference link qualities, e.g., the reference values for the SNR) for different beamforming gains 402 (e.g., different beamforming configurations achieving the different beamforming gains 402). The reference transmit power is β. For example, the link quality factors $P_i$ may be measured or reported and the reference link qualities are computed according to Equation (3).

Measurements for determining the reference link qualities, $LQ_i$, are performed using the different beamforming configurations (also referred to as beam candidates or beam patterns) for a given reference transmit power level, i.e., a value of β.

In an embodiment, the transmitting station (e.g., a first station or BS) transmits reference signals for each beam pattern. The receiving station (e.g., a second station or UE) reports the reference link quality (e.g., the SNR) based on the received reference signal for each beamforming configuration. E.g., each of the reference link qualities $LQ_1$ to $LQ_5$ is measured based on a different beamforming configuration (and, optionally, a different reference signal).

For controlling, in the step 204, the transmit power 404 to a level other than the reference transmit power, the reference link quality (e.g., the reference SNR) of the same beam pattern may be scaled (i.e., the reference value for the link quality is multiplied with the transmit power ratio) to determine the target link quality defined or estimated for the combination of the transmission parameters 402 and 404.

In another embodiment, a measurement is performed at the side of the receiving station (e.g., the UE) only for one or more particular reference beamwidths (or a reference beamforming configuration or a reference beamforming gain). The reference beamforming configuration may correspond to anisotropic or omni-directional radiant intensity 302 (e.g., at least in a cell or sector covering the receiving station). For example, the reference signal is (e.g., isotropically) transmitted without beamforming (i.e., reference beamforming gain $G_{reference}=1$) and the measurement of the reference link quality (e.g., the reference SNR) is performed and reported by the receiving station (e.g., the UE side).

The target link quality (e.g., the target SNR) is calculated for a beamforming gain 402, G, that is different from the one or more reference beamforming gains. The target link quality (e.g., the target SNR) for the respective beamforming gain 402 is calculated by scaling of one or more of the reference beamforming gains. E.g., the reference link quality $LQ_1$ is measured. The target link quality $LQ_2$ is calculated or estimated by scaling the reference beamforming gain $LQ_1$ based on the beamforming gain 402, $LQ_2$, e.g., in accordance with $$LQ_2 = LQ_1 \cdot \frac{G}{G_{reference}}.$$

For example, $LQ_2=0.8 \cdot LQ_1$ for a ratio of the beamforming gains equal to 0.8.

The MCS and the (e.g., target) link quality are related by a further mapping (e.g., using a mapping table or decision tree stored or implemented at the transmitting station performing the method).

In one implementation, the MCS may be determined based on the target link quality using the further mapping. According to the target link quality (e.g., the SNR information), the MCS (also: MCS level) is obtained using the further mapping to meet the QoS requirements (e.g., a certain BER target). The calculated target link quality may be input to the MCS determination. The MCS that is associated with a minimum link quality (e.g., a minimum SNR) closest to and below the calculated target link quality is selected. The latter MCS selection can achieve spectral efficiency.

In an alternative implementation or in addition, the target link quality may be determined based on the determined MCS using the further mapping. The MCS may be determined based on the QoS requirements. The determined MCS may be input to controlling the transmission parameters. The transmission parameters 402 and 404 may be controlled such that the target link quality (e.g., the SNR) defined or estimated based on the transmission parameters 402 and 404 is above a minimum link quality (e.g., a minimum SNR) required by the determined MCS. The latter controlling of the transmission parameters can achieve spectral efficiency.

Thus, in any implementation, the transmission parameters are jointly controlled to achieve QoS requirements with spectrum efficiency.

An implementation of the controlling in the step 204 (which is combinable with any other implementation or embodiment) includes determining selectable combinations of the transmission parameters by excluding combinations that violate the QoS requirements and/or the upper limit 406.

Those combinations of the transmission parameters which do not fulfill the regulatory requirements, e.g., the combinations of the transmission parameters 402 and 404 that violate the upper limit 406 (e.g., according to FIG. 4 or Table 1), are deleted or marked as excluded. The remaining other combinations are candidate transmission parameters for selection in controlling the transmission parameters according to the step 204.

Alternatively or in addition, the QoS requirements (e.g., the transmission rate) may exclude some of the combinations of the transmission parameters. For example, the target link qualities mapped to some combinations of the transmission parameters (e.g., according to Table 2) violate the minimum link quality of the MCS or a set of MCSs implied by the QoS requirements.

Alternatively or in addition, the controlling in the step 204 may include selecting one of the selectable combinations. The transmission parameters may be selected for each instance of the data transmission 204. In one embodiment, different selection modes may be triggered depending on different types of the data transmissions 204. The transmission type may be determined in the step 202 or during the step 204.

A first transmission type is determined, if the receiving station in the data transmission 204 has (e.g., relatively) high mobility. For the first transmission type, the transmission parameters are controlled according to the selectable combination of the transmission parameters, which yields the widest beamwidth 304.

A second transmission type is determined, if the power of the device 100 or the transmitting station is (e.g., relatively) limited for the data transmission 204. For the second transmission type, the transmission parameters are controlled according to the selectable combination of the transmission parameters, which yields the lowest transmit power 404.

A third transmission type is determined, if control information or any prioritized data is to be transmitted. For the third transmission type, the transmission parameters are controlled according to the selectable combination of the transmission parameters, which yields high robustness (e.g., the highest resulting SNR).

Figure 5:
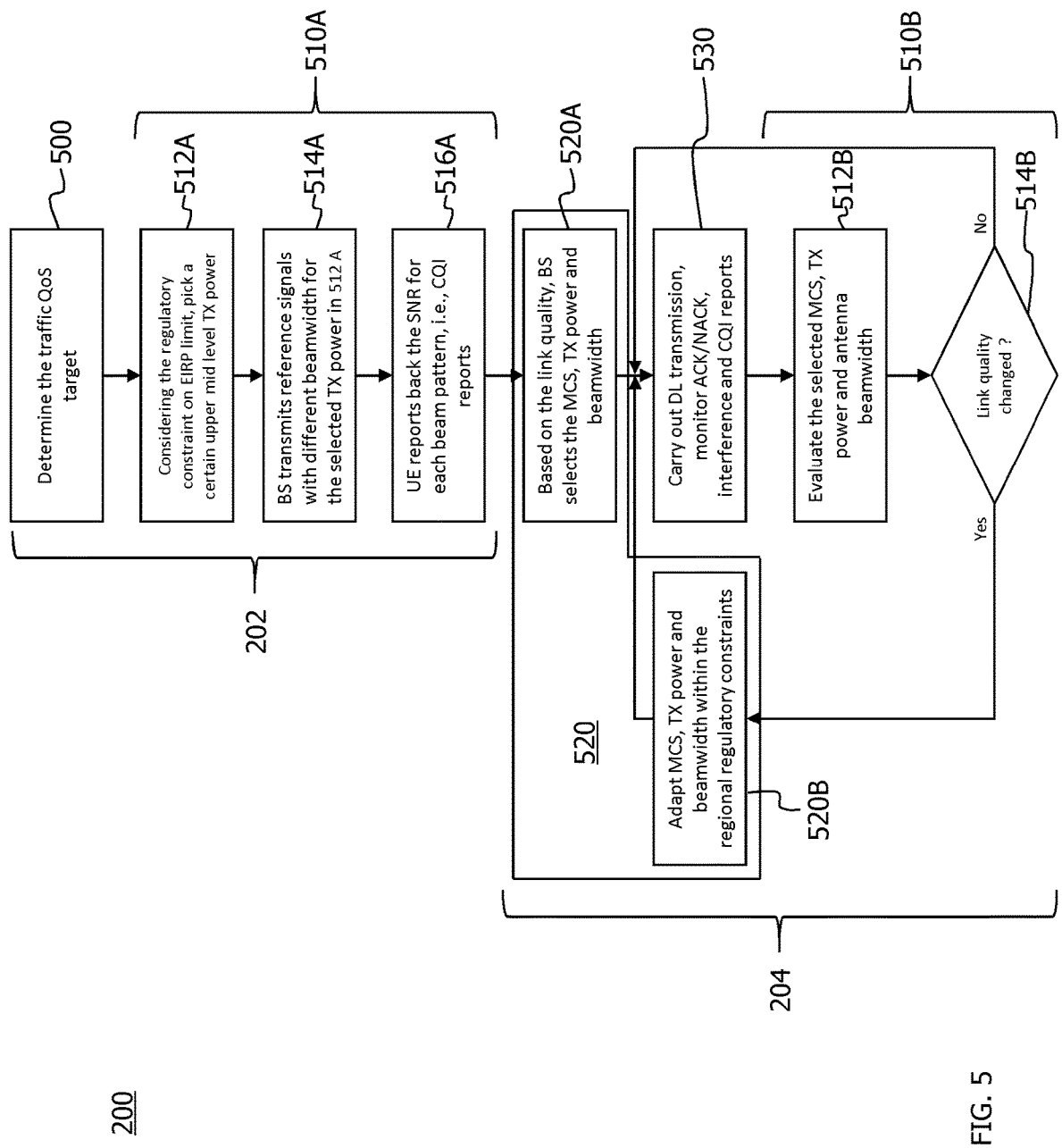
FIG. 5 shows a flowchart for an implementation of the method of FIG. 2.

FIG. 5 shows a flowchart for a first implementation of the method 200. For clarity and not limitation, the MCS is selected and the transmit (TX) power and the beamwidth 304 are controlled for the data transmission 204 in a downlink (DL) direction. For example, a BS selects the MCS and controls the transmit power level 404 and the beamwidth 304 according to the desired QoS parameters of the downlink (DL) traffic.

The step 202 is executed at an initialization stage and/or before the start of the data transmission 204.

The method 200 includes one or more steps 510A and 510B of determining the link quality. Preferably, one determining step 510A is performed prior to the data transmission 204, and another determining step 510B is performed during the data transmission 204.

Alternatively or in addition, the method 200 includes a step 520 of controlling the transmission parameters. Preferably, one controlling step 520A is performed prior to the data transmission 204, and another controlling step 520B is performed during the data transmission 204.

More specifically, the step 510A of determining the reference link quality is performed prior to the data transmission 204, e.g., in the step 202 that also includes the substep 500 of determining the QoS requirements. For example, the BS determines the QoS requirements of the traffic in the substep 500.

During a transmission phase of the step 204, which includes the DL transmission in a substep 530, the link quality is determined in the step 510B to maintain the target link quality or to adapt the MCS responsive to a change of the link quality.

In the first implementation shown in FIG. 5, the step 510A includes a substep 512A of controlling, based on the hardware capability (e.g., including the beamforming gains 402 achievable by the antenna array of the BS) and regional regulations on the maximum EIRP limit, the beamforming and the transmit power 404 which allows reference transmissions with a set of different beamforming configuration. As a non-limiting example, this could be 0.7 times the highest transmit power (cf. 0.7β in Table 1 or 2).

In substep 514A, the BS transmits the reference signals subsequently with different beamforming gains 402. In substep 516A, the receiving station (e.g., a terminal device or UE) replies back with the CQI reports that allow the BS to estimate the reference link quality (e.g., the SNR levels) at the receiving station corresponding to different reference signal transmissions with different beamwidths 304. It further allows the BS to estimate the target link quality (e.g., the SNR) at the receiving station with the scaled TX power levels 404 for the planned data transmission 204.

In the substep 520A, based on the link quality determined in the step 510A (e.g., according to Equation (3)), the BS selects the MCS level, TX power level 404 and the beamforming gain 402 for the data transmission carried out in substep 530.

The step 510B includes a substep 512B of evaluating the channel link quality (e.g., based on a further CQI report received in response to the substep 530) and, if a deviation is determined in the substep 514B, the transmission parameters including the MCS, TX power level 404 and the antenna beamwidth 304 are reconfigured in the step 520B. For example, the BS constantly receives CQI and ACK/NACK feedback in the substep 530 during the transmission phase, which allows the BS to evaluate the link quality in substep 512B and accordingly to optimize the transmission parameters in step 520B.

Figure 6:
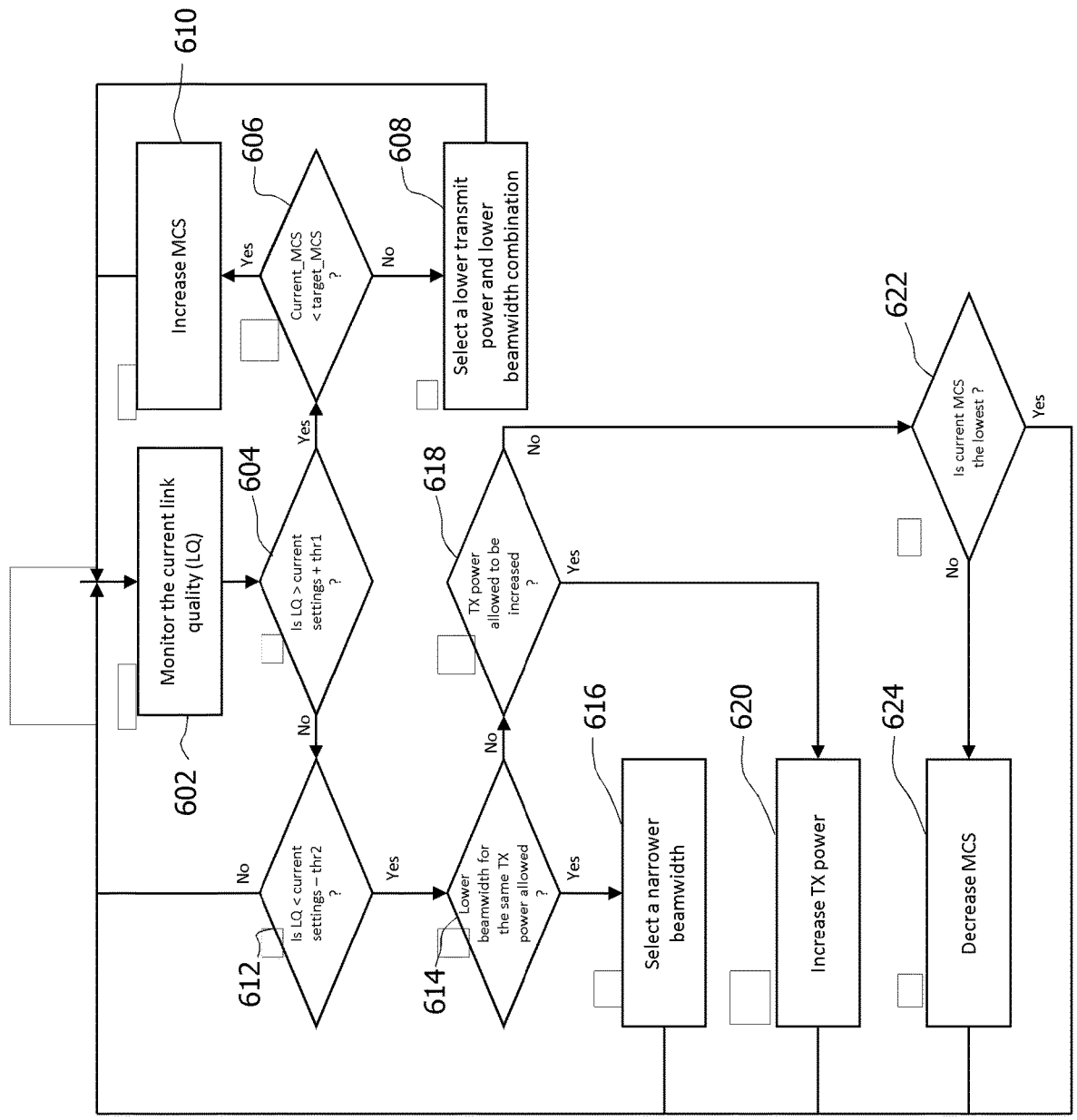
FIG. 6 shows a flowchart for an implementation of an adaptation, which is implementable in the methods of FIGS. 2 and 5.

FIG. 6 shows a flowchart for an implementation of the MCS selection and the transmission parameter controlling (e.g., adapting) in the step 204. Based on the link quality (LQ), the MCS, the TX power 404 and beamwidth 304 are determined so that the QoS requirements are satisfied.

The flowchart of FIG. 6 may be used in a second implementation of the method 200 (e.g., for the adaptation phase) or as a realization of the steps 510B and 520B of the first implementation of the method 200.

The actual LQ monitored during the step 204 may deviate from the target LQ defined by or estimated for the currently used transmission parameters 402 and 404, e.g., because the mapping (e.g., Table 2) or the reference LQs underlying the mapping are outdated.

The LQ is constantly monitored during the transmission process in a step 602 (which may be implemented in the step 512B). A step 604 (which may be implemented in the step 514B), determines whether or not the monitored LQ is above (e.g., or greater than) a configurable first threshold, thr1, plus the target LQ defined by the current parameter settings (MCS, TX power 404 and beamwidth 304). The first threshold, thr1, may be configured at runtime and indicates the allowance margin or sensitivity to adaptation and reconfigurability of the transmission parameters.

If the decision in the step 604 is positive (e.g., the monitored LQ has significantly improved) and the currently selected MCS is better than a target MCS or a minimum MCS for the QoS requirements (e.g., better than the MCS implied or required by the QoS requirements) according to step 606, a transmission parameter combination with a lower TX power 404 and/or a lower beamwidth is selected in a step 608. The rationale behind the selection of the lower TX power is to reduce energy consumption during the transmission 204. The lower beamwidth adds directivity gains to the transmission 204 and, potentially, reduces the spectral interference to other collocated stations. While often slightly conservative beamwidth 304 and TX power 404 are selected, i.e., a wider beamwidth 304 and high TX power 404, the steps 604, 606 and 608 allow optimizing the transmission parameters provided that the monitored link quality is more than sufficient for achieving the QoS requirements. Optionally, the method 200 may limit the selection of a narrower beamwidth 304, e.g., depending upon the robustness requirements against mobility and blockage.

If, on the contrary, the currently selected MCS is lower than the target MCS or minimum MCS for satisfying the QoS requirements in the step 606, a higher MCS value (or MCS level) is selected in a step 610. The steps 604, 606 and 610 allow exploiting the higher link quality. Using the higher MCS value in turn reduces the transmission time for the same amount of data to be transmitted and, thus, improves the channel utilization and transmission efficiency. Alternatively or in addition, the steps 604, 606 and 610 allow recovering from a lower MCS in order to meet the QoS requirements. The incrementing step 610 in an MCS selection table (e.g., above further mapping) may be exercised corresponding to the improvement of the monitored LQ compared to the LQ (e.g., the target LQ) defined by the currently used transmission parameters. Alternatively, the incrementing step 610 may adapt the MCS in gradual steps.

If, in the step 604, the monitored LQ is not better than the LQ (e.g., the target LQ) defined by the currently used transmission parameters plus the configurable first threshold thr1, a step 612 determines whether or not the monitored LQ is worse than the LQ (e.g., the target LQ) defined by the currently used transmission parameters minus a second configurable threshold, thr2. The thresholds thr1 and thr2 cause a hysteresis (i.e. distinct upper and lower margins) around the LQ on which the current parameter settings are based. If the lower margin for the monitored LQ is not met (i.e., LQ defined by current settings−thr2<monitored LQ<LQ defined by current settings+thr1), no adaptation is carried out.

If, in the step 612, the monitored LQ is significantly reduced (i.e., monitored LQ<LQ defined by current settings−thr2), the adaptation is carried out. A step 614 determines whether or not a narrower beamwidth 304 for the same TX power 404 is allowed according to the maximum EIRP 406 (e.g., of regional regulations). If the beamwidth 304 is allowed to be reduced for the same TX power level 404 according to the (i) maximum EIRP limit 406, (ii) hardware capability and (iii) consideration for mobility/blockage of beam, the beamwidth 304 is narrowed in a step 616. Reducing the beamwidth 304 can allow exploiting the beamforming gains 402 leading to better SNR and, eventually, to improve the link quality to achieve the QoS requirement.

If, in the step 614, a lower beamwidth 304 for the same TX power 404 is not allowed according to the maximum EIRP 406, step 618 determines whether or not the TX power 304 can be increased on the hardware of the transmitting station.

If it is not allowed to (a) further narrow the beamwidth 304 as per the regulatory constraints (e.g. due to the maximum EIRP 406), mobility sensitive deployment or device capability according to the step 614, and to (b) increase the TX power 404 according to the step 618, and if the currently used MCS value is not the lowest selectable MCS value according to a step 622, the MCS value is decreased in a step 624. The decrementing step 624 in the MCS selection table (e.g., above further mapping) may be exercised corresponding to the deterioration in the monitored LQ compared to the LQ (e.g., the target LQ) defined by the currently used transmission parameters. Alternatively, the decrementing step 624 may adapt the MCS in gradual steps.

Figure 7:
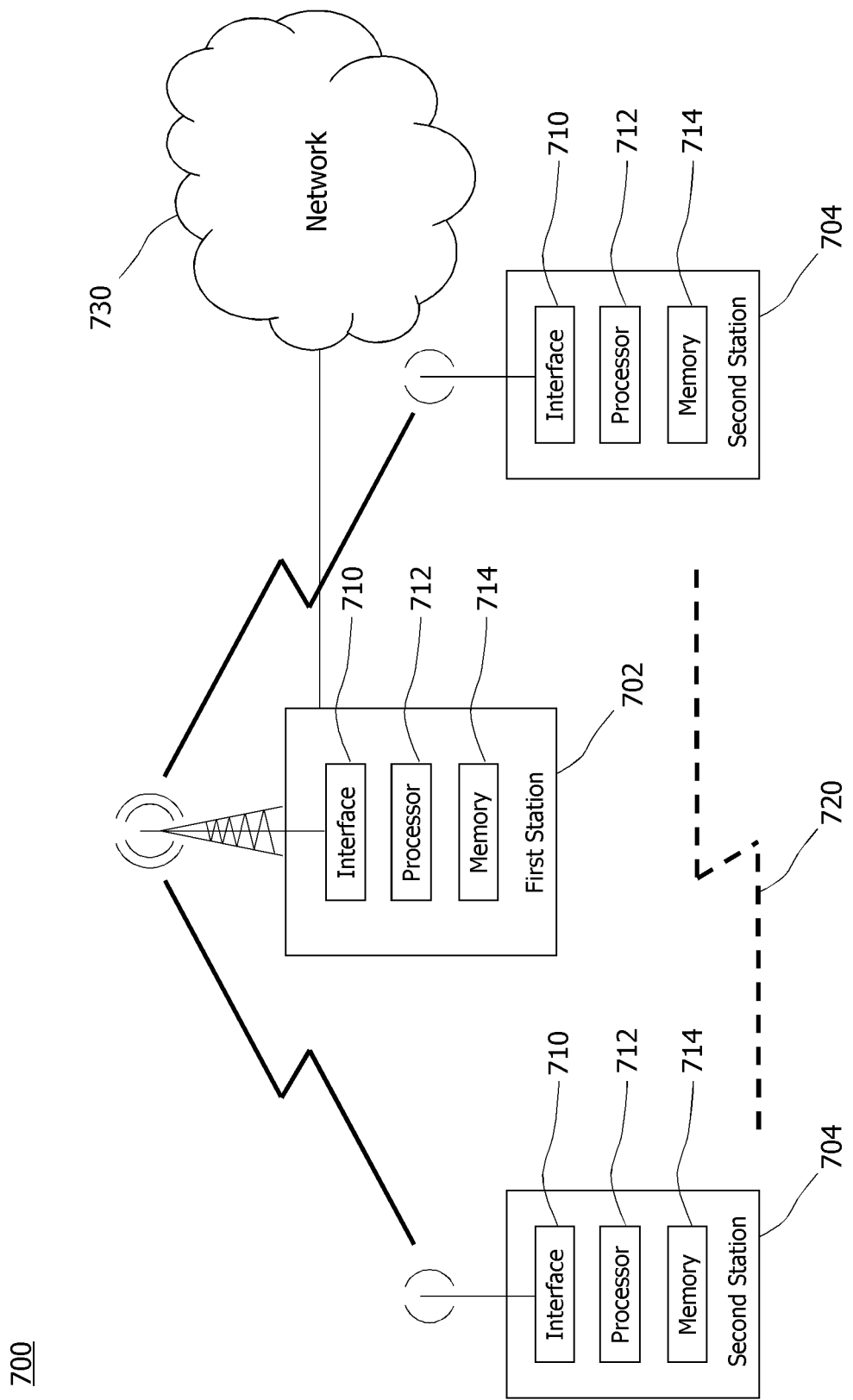
FIG. 7 schematically illustrates an exemplary radio access network as environment for implementing method of FIG. 2.

FIG. 7 schematically illustrates an embodiment for the RAN 700. The RAN 700 comprises a plurality of station 702 and 704. Any of the stations 702 and 704 may include an embodiment of the device 100 to perform the method 200.

Each of the stations 702 and 704 comprises an interface 710 for feeding the antenna signals to the antenna array of the corresponding station, one or more processors 712 and memory 714 operatively coupled to the processor. The memory 714 is encoded with instructions that, when executed by at least one of the processors 712, cause the processor to determine a QoS requirement for data to be transmitted. The instructions for the determining step 202 may be included in the QoS module 102 stored in the memory 714.

The memory 714 is further encoded with instructions that, when executed by at least one of the processors 712, cause the processor to transmit the data using the antenna array for beamforming, wherein the beamforming and a transmit power of the data transmission are controlled depending on both the QoS requirement and an upper limit for a radiant intensity of the data transmission. The instructions for the transmitting step 204 may be included in the transmission module 104 stored in the memory 714.

The plurality of stations 702 and 704 may include at least one first station 702 as a base station or access point. The first station 702 may provide radio access to a plurality of second stations 704.

Alternatively or in addition, the second stations 704 or all stations of the RAN 700 are configured for performing the method 200 in relation to each other. For example, the stations 704 may be configured for direct communication 720.

Optionally, at least one of the stations of the RAN 700 (e.g., the at least one first station 702) may be connected to a backhaul network 730 of the RAN or the Internet.

As has become apparent from above description of exemplary embodiments, at least some embodiments allow wireless communication systems, including the 5G New Radio system, to control the beamforming gain and the transmit power in a manner that spectrum regulations are not violated. This is especially relevant for the unlicensed spectrum bands for which each sub-band and geographical region can specify its own limits on the maximum allowed EIRP levels that include the transmit power, antenna gains and the beamforming gains. The technique can be applied in a flexible manner for different regional regulations of the sub-band frequency regulations.

Same or other embodiments control the beamwidth of a transmission so that the antenna beam directivity provides low enough (e.g., acceptable) interference to collocated transmissions. Using narrow beam transmissions may allow lower interference levels for collocated networks. Alternatively or in addition, e.g., at the same time, the desired robustness against mobility effects and coverage can be achieved.

While the transmit power and the beamforming (or directivity) gains can be controlled to achieve the desired signal-to-noise-ratio (SNR) at the receiving station. Controlling the transmission parameters in turn allows selecting the appropriate MCS for the desired reliability and target throughput. In particular, the technique can be implemented to control the transmit power, the adaptive beamforming and the MCS to use the network and the radio resources in an optimized manner.

Controlling the transmission parameters and/or selecting the MCS can be adaptively performed and at runtime to achieve varying targets of the QoS requirements (e.g., throughput, reliability, etc.). The controlling and/or the selection can be applied before carrying out the transmission and/or during a transmission phase. The controlling and/or the selection can enable link adaptation.

The technique can be implemented to jointly determine the transmit power, the beamwidth and the MCS. The transmit power and beamforming gains can be jointly controlled in an adaptive manner in order to achieve target signal-to-noise ratio, which is needed to obtain the desired throughput and reliability through an optimal MCS selection. Moreover, the controlling of the transmission power and the beamforming gain is carried out in a manner that the spectrum regulations are not violated. The joint determination of the transmission power, beamforming gains and MCS can be carried out before each transmission as well as for link adaptation.

The actual values for the beamforming gains and the transmission power level can be based on the specific regulations of the frequency band, in which the system is operated. In particular, the spectrum regulations in the unlicensed spectrum can be much stricter compared to the licensed spectrum, and the joint control of transmit power and antenna beamforming gain has high relevance to the operation in the unlicensed spectrum.

As a further aspect, the beamforming gain and the transmission power level can be controlled so as to address the tradeoff between the inflicted wireless interference to other devices and the robustness to mobility. The interference to collocated transmitters can be minimized using narrow-beam transmissions, whereas using a wider beamwidth can be beneficial for robustness against mobility effects and for better coverage. The joint selection of MCS along with the transmit power and the beamforming gain can depend upon the QoS requirements in the given spectral environment and deployment setup.

Many advantages of the present invention will be fully understood from the foregoing description, and it will be apparent that various changes may be made in the form, construction and arrangement of the units and devices without departing from the scope of the invention and/or without sacrificing all of its advantages. Since the invention can be varied in many ways, it will be recognized that the invention should be limited only by the scope of the following claims.

The invention claimed is:

1. A method of transmitting data in a radio access network (RAN), the method comprising:
    determining Quality of Service (QoS) requirements for the data to be transmitted;
    selecting a modulation and coding scheme (MCS), a transmit power and a beamforming for data transmission based on a target link quality determined from a report received in response to transmission of reference signals using a reference transmit power and a reference beamforming configuration;
    transmitting the data using an antenna array for beamforming, wherein the beamforming, the MCS and the transmit power of the data transmission are jointly controlled according to the QoS requirements and within an upper limit for a radiant intensity of the data transmission to achieve the target link quality, wherein the upper limit for the radiant intensity is isotropic; and
    in response to a deviation in the target link quality during the transmitting is determined upon evaluation, reconfiguring the MCS, the transmit power and the beamforming within regional regulations on the upper limit for the radiant intensity.

2. The method of claim 1:
    wherein the data is transmitted from a transmitting station in the RAN to at least one receiving station in the RAN;
    wherein at least one of the transmitting station and the receiving station is a node of the RAN, the node providing radio access to a plurality of stations in the RAN.

3. The method of claim 1, wherein the upper limit for the radiant intensity is defined in terms of: an Effective Radiated Power and/or an Equivalent Isotropically-Radiated Power (EIRP).

4. The method of claim 3, wherein the product of the transmit power and the beamforming gain is equal to or less than an EIRP limit.

5. The method of claim 4, wherein the product of the transmit power and the beamforming gain is limited by the upper limit for the radiant intensity.

6. The method of claim 1, wherein the beamforming defines a beamforming gain.

7. The method of claim 1, wherein the beamforming defines a beamwidth.

8. The method of claim 7, wherein the QoS requirement is indicative of a lower limit for the beamwidth.

9. The method of claim 7:
    wherein the QoS requirement is indicative of robustness of the data transmission and/or mobility of a station receiving the data transmission;
    wherein the beamwidth is increased as the robustness increases and/or the beamwidth is decreased as the mobility decreases.

10. The method of claim 1, wherein the data transmission uses the MCS depending on: the QoS requirement, the upper limit for the radiant intensity, the beamforming, and/or the transmit power.

11. The method of claim 10, further comprising:
    transmitting one or more reference signals to the receiving station; and
    receiving a report based on the reference signals from the receiving station, the report being indicative of at least one of the link quality and the MCS.

12. The method of claim 11:
    wherein the reference signals are transmitted using a reference transmit power;
    and wherein controlling the transmit power of the data transmission includes scaling the reference transmit power based on at least one of the estimated link quality and the reported link quality.

13. The method of claim 12:
    wherein the link quality is estimated and/or reported for each of a plurality of configurations of the beamforming;
    wherein the beamforming is controlled according to one of the beamforming configurations; and
    wherein the reference transmit power is scaled based on the estimated or reported link quality corresponding to the one of the beamforming configurations.

14. The method of claim 11, wherein the link quality is estimated and/or reported for each of a plurality of configurations of the beamforming.

15. The method of claim 14, wherein the beamforming is controlled according to one of the beamforming configurations.

16. The method of claim 14, wherein each of the beamforming configurations corresponds to a different one of a plurality of beamwidths and/or beamforming gains.

17. The method of claim 11:
    wherein the link quality is estimated and/or reported based on the reference signals using one or more configurations of the beamforming; and
    wherein the beamforming is controlled in the data transmission according to a beamforming configuration other than the one or more beamforming configurations.

18. The method of claim 17, wherein the controlling the transmit power in the data transmission includes scaling the reference transmit power based on a beamforming gain defined by or estimated for the other beamforming configuration.

19. The method of claim 10, further comprising:
receiving one or more reference signals from the receiving station; and
based on the received reference signals, estimating the link quality and/or determining the MCS.

20. The method of claim 4:
wherein the QoS requirement implies at least one MCS, which requires a minimum link quality;
wherein the beamforming and the transmit power are controlled to fulfill both the minimum link quality and the upper limit for the radiant intensity.

21. The method of claim 1, wherein the transmit power and the beamforming define or allow estimating a link quality at a receiving station of the RAN for the data transmission.

22. The method of claim 1, wherein the QoS requirement and/or the upper limit for the radiant intensity of the data transmission are determined for each data transmission.

23. The method of claim 1, wherein a frequency for the data transmission is equal to or greater than 6 GHz.

24. The method of claim 3, wherein the data transmission uses unlicensed spectrum.

25. A non-transitory computer readable recording medium storing a computer program product for transmitting data in a radio access network (RAN), the computer program product comprising software instructions which, when run on processing circuitry of a computing device, causes the computing device to:
determine Quality of Service (QoS) requirements for the data to be transmitted;
select a modulation and coding scheme (MCS), a transmit power and a beamforming for data transmission based on a target link quality determined from a report received in response to transmission of reference signals using a reference transmit power and a reference beamforming configuration;
transmit the data using an antenna array for beamforming, wherein the beamforming, the MCS and the transmit power of the data transmission are jointly controlled according to the QoS requirements and within an upper limit for a radiant intensity of the data transmission to achieve the target link quality, wherein the upper limit for the radiant intensity is isotropic; and
in response to a deviation in the target link quality during the transmitting is determined upon evaluation, reconfigure the MCS, the transmit power and the beamforming within regional regulations on the upper limit for the radiant intensity.

26. A device for transmitting data in a radio access network (RAN), the device comprising:
processing circuitry;
memory containing instructions executable by the processing circuitry whereby the device is operative to:
determine Quality of Service (QoS) requirements for the data to be transmitted;
select a modulation and coding scheme (MCS), a transmit power and a beamforming for data transmission based on a link quality determined from a report based on transmission of reference signals using a reference transmit power and a reference beamforming configuration;
transmit the data using an antenna array for beamforming, wherein the beamforming, the MCS and the transmit power of the data transmission are jointly controlled according to the QoS requirements and within an upper limit for a radiant intensity of the data transmission to achieve the target link quality, wherein the upper limit for the radiant intensity is isotropic; and
in response to a deviation in the target link quality during the transmitting is determined upon evaluation, reconfigure the MCS, the transmit power and the beamforming within regional regulations on the upper limit for the radiant intensity.

* * * * *